Feb. 14, 1933. F. S. McCULLOUGH 1,897,761
SEAL FOR VITREOUS ARTICLES
Filed April 12, 1928
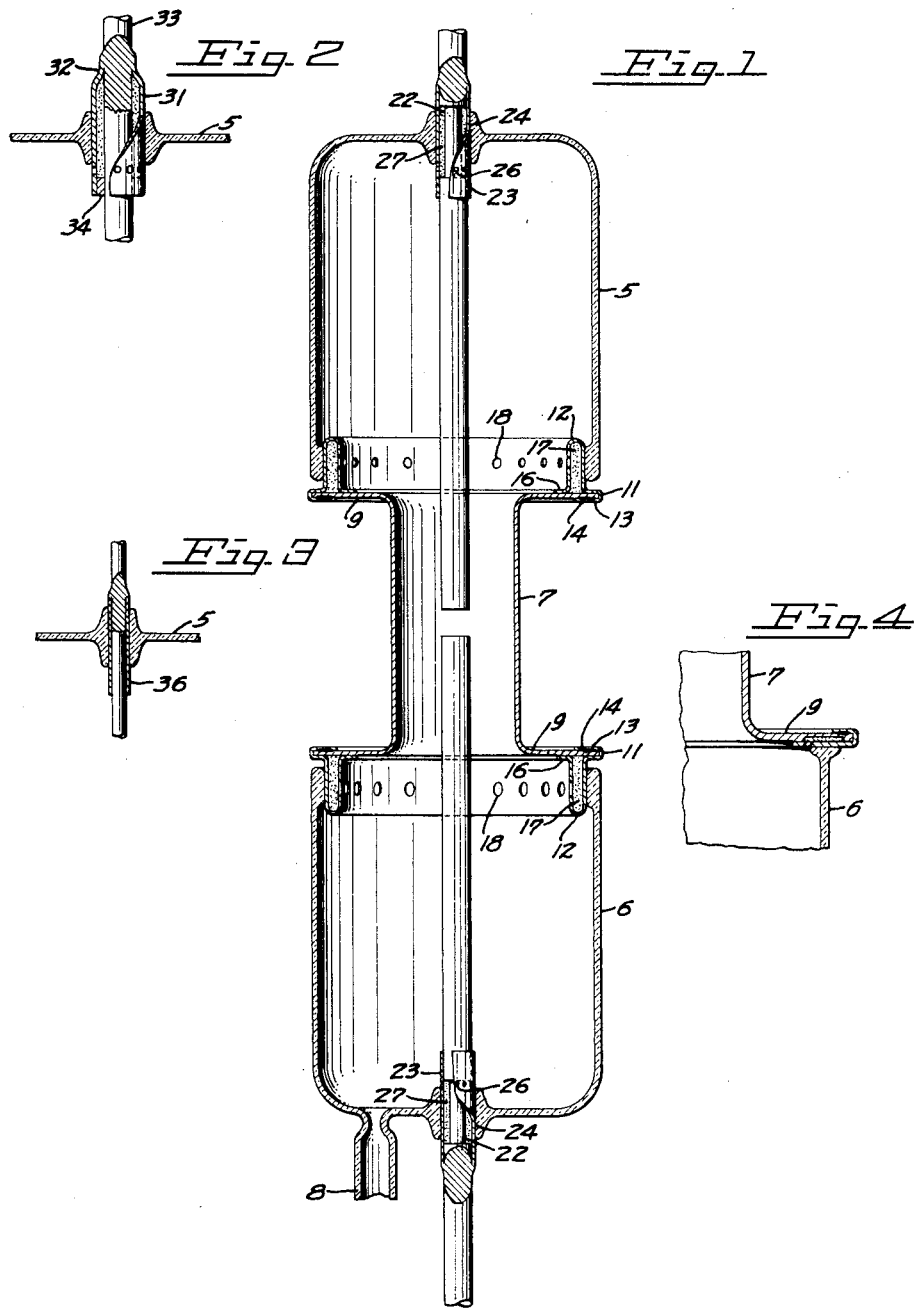
INVENTOR
FREDERICK S. McCULLOUGH
BY Charles S. Evans
HIS ATTORNEY.

Patented Feb. 14, 1933

1,897,761

UNITED STATES PATENT OFFICE

FREDERICK S. McCULLOUGH, OF EDGEWOOD, PENNSYLVANIA

SEAL FOR VITREOUS ARTICLES

Application filed April 12, 1928. Serial No. 269,439.

My invention relates to the art of glass-working, and particularly to methods of sealing large metal parts to or through the walls of vitreous vessels to produce an impervious joint.

The broad purpose of my invention is to produce a seal which is at once capable of sustaining relatively heavy weights, gas-tight, and not subject to cracking due to differential expansion of the parts.

An object of my invention is to provide means for removing from a glass vessel any gas which may be liberated from a heated seal.

Another object of my invention is to provide a seal which acts as a cushion between glass and metal.

Still another object of my invention is to provide a seal which does not materially increase the electrostatic capacity of the device in which it is used.

My invention possesses other objects and valuable features, some of which will be set forth in the following description of my invention which is illustrated in the drawing forming part of the specification. It is to be understood that I do not limit myself to the showing made by the said description and drawing, as I may adopt varying forms of my invention within the scope of the claims.

Referring to the drawing:—

Fig. 1 is an axial sectional view of an embodiment of my invention.

Figs. 2, 3 and 4 are fragmentary sectional views showing other modifications of my invention which are useful in certain special applications.

Broadly considered, my invention is a coupling for uniting a vitreous and a metallic element comprising a coupling member bridging a portion of one of the elements and fused in its reach to the other element. The bridging member is made sufficiently thin so that it has less strength than either the vitreous element or its junction therewith; and differential expansion, instead of breaking the vitreous element merely deforms the bridging member. Where the coupling is used in an evacuated vessel, a sorptive material or "getter" may be retained beneath the reach of the bridging member, which is preferably provided with ports opening into the evacuated chamber.

Seals of this type are applicable to quartz lamps, vacuum tubes, chemical glassware, and many other uses. In electrical discharge apparatus the bridged element is usually the metallic one. In this case the thin and deformable bridging member is supported by the metallic element on both sides of its point of fusion to the vitreous element, and is thus capable of supporting large weights in spite of its own intrinsic weakness. A lead may be carried through the wall of the vessel by this method without materially increasing its electrostatic capacity, which may be a highly important feature in apparatus of this class. Moreover, the getter beneath the bridging member is located close to the seal, where it can quickly remove any gas liberated therefrom. As a seal can never be as thoroughly degasified as the other parts of apparatus of this character, the getter is thus in the position where it is most effective.

The embodiment of my invention which I have chosen for detailed description is a vacuum lightning arrester.

This comprises an evacuated container formed of a pair of glass vessels 5 and 6, between which is sealed a metallic tubular part 7. An exhaust tubulation 8 is provided in the glass vessel 6. The ends of the tube 7 are flared outwardly to form flanges 9 which serve to radiate a large portion of the heat, which may be generated within the tube, before it reaches the seal.

Welded or otherwise hermetically secured to the outer rim of the flange is an annular coupling member, preferably of copper, generally designated by the reference figure 11. The coupling is preferably formed of metal of a substantially uniform thickness, and is so proportioned with respect to the glass to which it is fused that the glass has the greater strength. Differential expansion or contraction between the glass and the coupling will, therefore, cause deformation of the latter instead of breaking either the glass or the seal.

The cross section of the coupling comprises a U-shaped portion 12, which bridges a portion of the flange 9. The outer U-wall has at its end a flange 13 which is hermetically joined to the flange 9, preferably by a weld 14, forming a fixed abutment. The inner wall of the U is also provided with a flange 16 at its end which rests against the flange 9 to form the other abutment. The flange 16 may be spot-welded to the flange 9 at a few points. Between the walls of the U is a space which may be filled with a getter 17 which may be tantalum, calcium, thoria, or any of the materials used for this purpose. Gas in the tube has access to the getter through ports 18 in the inner U walls.

The glass elements 5 and 6 are fused to the outer of the U walls in the usual way, care being taken that little perpendicular pressure is exerted on the wall of the coupling.

Cylindrical leads are sealed through the ends of the glass ports 5 and 6. These leads comprise heavy rods in which are formed grooves 22. Bridging the grooves are sleeves 23, also preferably of copper and designed with respect to the same considerations of relative strength as govern the design of the couplings 11. The outer end of each sleeve is hermetically secured to the rod 21, as by welding. The inner end overlies the rod and is supported thereby, but there is no rigid connection between the two. The glass is fused to the reach of the sleeve between its abutments on the rod, forming the seal 24, so that the full radial strength of the rod is never exerted on the seal by differential expansion or contraction. Preferably ports 26 open from the groove into the vacuum chamber, and the groove may contain a getter 27 as described above, but if desired the ports may be omitted, the space between the lead and the sleeve taking their place.

It will be seen that the principle of both seals is the same. The glass is sealed to a coupling member, preferably of uniform thickness, which is weak and deformable by the stresses due to temperature changes in metal or glass, but which is so supported as to be strong and rigid against bending or weight stresses. These same principles may be used in other modifications. Thus Fig. 2 shows a construction in which the groove is omitted, one end of the sleeve 31 being drawn down to a neck 32 which conforms in diameter to the rod 33 to which it is welded. A collar 34 on the rod forms the other abutment for the sleeve.

In Fig. 3 is shown a construction which may be used with leads of small diameter. In this case the sleeve 36 is an easy sliding fit over the rod, to which one end is welded. Owing to the small size of the parts the space between the lead and the sleeve, even though it is only of the order of one thousandth of an inch in width is sufficient to prevent the full radial strength of the lead being exerted against the glass, and in this case, as in the other forms shown, I have a true bridging of the lead by the sleeve, even though the space beneath the reach is microscopic. The free end of the sleeve rests on the lead as an abutment if the joint be stressed, and therefore, the leverage of the sleeve on the juncture is not such as readily to cause fracture.

Fig. 4 illustrates the use of the grooved construction in connection with a flange joint. Other modifications of my invention will suggest themselves to those skilled in the art.

By "bridging", I mean spanning over, and contacting at the ends or abutments, but spaced in the reach or portion between abutments. By the term "fused to", I mean that the elements are heated until one of them is softened and adheres to the other upon contact therewith. In my copending application Serial No. 269,440, filed April 12, 1928, I have made claims to the particular joint structures comprising the U-shaped member 11.

I claim:

1. An article of the class described, comprising a vitreous element, a metallic element passing through the vitreous element and having an annular groove therein at the place where the metallic element passes through the vitreous element, and a member considerably thinner than said metallic element bridging said groove and also passing through the vitreous element, the vitreous element being fused to said member intermediate the ends of said member.

2. A coupling for uniting the vitreous element to a metallic element, comprising a sleeve surrounding and bridging a portion of said metallic element and fused between its ends to the vitreous element through which it passes, said sleeve having one of its ends hermetically united with said metallic element and the other end freely supported thereby, the intermediate portion of the sleeve being out of contact with the metallic element.

3. A coupling for uniting a vitreous element to a metallic element, which element has two separated abutments thereon comprising a member which is considerably thinner and more flexible than the metallic element, bridging the portion of the metallic element between the abutments, and having the vitreous element fused thereto intermediate its ends, said member being hermetically united to the metallic element at one abutment and being freely supported on the other abutment.

4. In a coupling for uniting a vitreous element and a metallic element, a ported compartment adjacent the juncture of said elements and a getter in said compartment.

5. In a coupling for uniting a vitreous element and a metallic element, a member bridging a portion of the metallic element and having ports therein, said element being fused in its reach to the vitreous element, and a getter retained beneath the reach of said member.

6. A structure of the class described comprising a vitreous vessel, a rod-like member extending through the wall of the vessel, a sleeve surrounding the rod-like member supported at its ends by the rod and having one end hermetically sealed to the rod and having the other end unattached to the rod but suported thereby, the vitreous vessel being fused to the sleeve intermediate its ends, the sleeve passing through the vitreous vessel, said sleeve being more flexible in a direction transverse to the axis of the rod than the rod or the vessel.

In testimony whereof, I have hereunto set my hand.

FREDERICK S. McCULLOUGH.